United States Patent

Nemesh

(10) Patent No.: US 9,914,338 B2
(45) Date of Patent: Mar. 13, 2018

(54) THERMAL MANAGEMENT SYSTEM FOR A VEHICLE

(71) Applicant: GM GLOBAL TECHNOLOGY OPERATIONS LLC, Detroit, MI (US)

(72) Inventor: Mark D. Nemesh, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 981 days.

(21) Appl. No.: 14/199,444

(22) Filed: Mar. 6, 2014

(65) Prior Publication Data

US 2015/0251518 A1   Sep. 10, 2015

(51) Int. Cl.
*F25B 41/00* (2006.01)
*F25B 49/00* (2006.01)
(Continued)

(52) U.S. Cl.
CPC ..... *B60H 1/00764* (2013.01); *B60H 1/00278* (2013.01); *B60H 1/00485* (2013.01); *B60H 1/00878* (2013.01); *B60H 1/00885* (2013.01); *B60H 1/00899* (2013.01); *B60H 1/03* (2013.01); *B60H 1/06* (2013.01); *B60H 1/3208* (2013.01);
(Continued)

(58) Field of Classification Search
CPC .......................... B60H 1/004; B60H 1/00385; B60H 1/00764; B60H 1/00885; B60H 1/00278; B60H 1/00485; B60H 1/00878; B60H 1/00899; B60H 1/3213; B60H 1/3208; B60H 1/03; B60H 1/06; B60H 2001/00307; B60H 2001/00949; B60H 2001/00928
See application file for complete search history.

(56) References Cited

U.S. PATENT DOCUMENTS

2010/0012295 A1 * 1/2010 Nemesh ............. B60H 1/00278
165/104.19
2011/0281515 A1 * 11/2011 Lockwood ................ F01P 7/12
454/75
(Continued)

FOREIGN PATENT DOCUMENTS

JP    2011255734 A  * 12/2011

OTHER PUBLICATIONS

Hamamoto et al., Air Conditioner for Vehicle, Dec. 22, 2011, JP2011255734A, Whole Document.*

*Primary Examiner* — Larry Furdge
(74) *Attorney, Agent, or Firm* — Quinn IP Law

(57) ABSTRACT

A thermal management system for a vehicle and a method for controlling the same are provided. The thermal management system comprises a first coolant circuit, a second coolant circuit, a refrigerant circuit, and a controller. The first coolant circuit includes at least a first coolant circuit heat exchanger, a Coolant Heater Control Module (CHCM), a CHCM mixing valve, and a bypass valve. The CHCM mixing valve is configured to modulate flow of a coolant between the first coolant circuit heat exchanger and the CHCM. The bypass valve is configured to link the first coolant circuit with the engine. The controller directs the thermal management system to operate in one of a high efficiency mode, a heat pump assist mode, a maximum performance mode, and a propulsion system energy improvement mode, effectuating the selected mode of operation via the actuation of the CHCM valve and the bypass valve to predetermined positions.

13 Claims, 11 Drawing Sheets

(51) Int. Cl.
*B60H 1/00* (2006.01)
*B60H 1/03* (2006.01)
*B60H 1/06* (2006.01)
*B60H 1/32* (2006.01)

(52) U.S. Cl.
CPC . *B60H 1/3213* (2013.01); *B60H 2001/00307* (2013.01); *B60H 2001/00928* (2013.01); *B60H 2001/00949* (2013.01)

(56) References Cited

U.S. PATENT DOCUMENTS

2012/0017637 A1* 1/2012 Nakajo ................ B60H 1/03
62/515
2012/0090806 A1* 4/2012 Beschieru .......... B60H 1/00278
165/41

* cited by examiner

US 9,914,338 B2

THERMAL MANAGEMENT SYSTEM FOR A VEHICLE

TECHNICAL FIELD

The disclosure relates to a thermal management system for a vehicle and a method for controlling the same.

BACKGROUND

Hybrid electric vehicles selectively use an internal combustion engine as a source of input torque to a transmission, alone or in conjunction with one or more traction motor(s), while extended-range electric vehicles use a smaller engine only when needed, and solely to power an electric generator. Battery electric vehicles forego use of the small gas engine, and instead operate using stored electrical energy or regenerative braking energy. All three vehicle configurations can operate solely on electricity in what is referred to as an electric vehicle (EV) mode.

Some electric vehicles utilize a heat pump system to heat and cool the vehicle passenger compartment, utilizing a front-end heat exchanger as the evaporator and an accumulator-type refrigerant system. In such systems the front-end heat exchanger may ice-up over time and require a de-icing function, which causes low-capacity heating in mild and cold ambient temperatures.

SUMMARY

A thermal management system for a vehicle having an engine and a method for controlling the same are provided. The thermal management system may include a first coolant circuit, a refrigerant circuit, and a controller.

The first coolant circuit is configured to circulate a first coolant to moderate the temperature of the engine, and also to condition air to be received by a vehicle passenger compartment. The first coolant circuit may include at least a first coolant pump, a first coolant circuit heat exchanger, a Coolant Heater Control Module (CHCM), a CHCM mixing valve, and a bypass valve.

The first coolant pump is configured to pump and/or circulate the first coolant through the first coolant circuit. The first coolant circuit heat exchanger exchanges heat between the first coolant and the refrigerant circulating therethrough.

The CHCM is configured to heat the first coolant in order to provide additional heat to the passenger compartment or to warm the engine during cold start. The CHCM includes a high voltage heating element. The CHCM mixing valve is configured to receive the first coolant from the first coolant pump, and also to occupy one of a first position, a second position, and a third position, such that the CHCM mixing valve modulates flow of the first coolant between the CHCM and the first coolant circuit heat exchanger.

The bypass valve is configured to occupy one of a bypass position and a linked position, such that the bypass valve directs the first coolant to the first coolant pump when occupying the bypass position and directs the first coolant to the engine in the linked position.

The refrigerant circuit is configured to circulate a refrigerant and condition air to be received by the passenger compartment, i.e. cool and/or dehumidify the air to be received by the passenger compartment. The refrigerant circuit may include at least a compressor, the first coolant circuit heat exchanger, and an AC condenser. The refrigerant circuit is further configured to operate in one of a first mode and a second mode. In the first mode, the compressor expels refrigerant exclusively to the first coolant circuit heat exchanger. In the second mode, compressor expels refrigerant exclusively to the AC condenser.

The controller includes a processor and tangible, non-transitory memory on which is recorded instructions. Executing the recorded instructions causes the processor to actuate the CHCM mixing valve and the bypass valve to predetermined positions to effectuate a selected mode of operation for the thermal management system, wherein the selected mode of operation is one of a high efficiency mode, a heat pump assist mode, a maximum performance mode, and propulsion system energy improvement mode.

Execution of the recorded instructions causes the processor to complete the following example method steps to effectuate the operation of the thermal management system in the selected mode of operation. First, the controller selects a mode of operation for the thermal management system, wherein the mode of operation is one of a high efficiency mode, a heat pump assist mode, a maximum performance mode, and a propulsion system energy improvement mode. Second, the controller signals the thermal management system to operate in the selected mode of operation. Third, the controller actuates a bypass valve to occupy one of a bypass position and a linked position. Fourth, the controller actuates a Coolant Heater Control Module (CHCM) valve to occupy one of a first position, a second position, and a third position. Fifth, the controller signals the refrigerant circuit to operate in one of a first mode and a second mode, based upon the selected mode of operation.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

The following description and figures refer to example embodiments and are merely illustrative in nature and not intended to limit the invention, its application, or uses. Throughout the figures, some components are illustrated with standardized or basic symbols. These symbols are representative and illustrative only, and are in no way limiting to any specific configuration shown, to combinations between the different configurations shown, or to the claims. All descriptions of componentry are open-ended and any examples of components are non-exhaustive.

Referring to the figures, wherein like reference numbers correspond to like or similar components throughout the several views, a thermal management system 10 is provided for use in a vehicle having a passenger compartment 12, a battery 14, and an engine 16. The thermal management system 10 may include a combination heat pump system and Coolant Heater Control Module (CHCM) heating system to allow for efficient heating of the passenger compartment 12 in all ambient temperatures, and efficient warm-up of the engine 16, when there is a cooling demand from the passenger compartment 12.

Figure 3A:
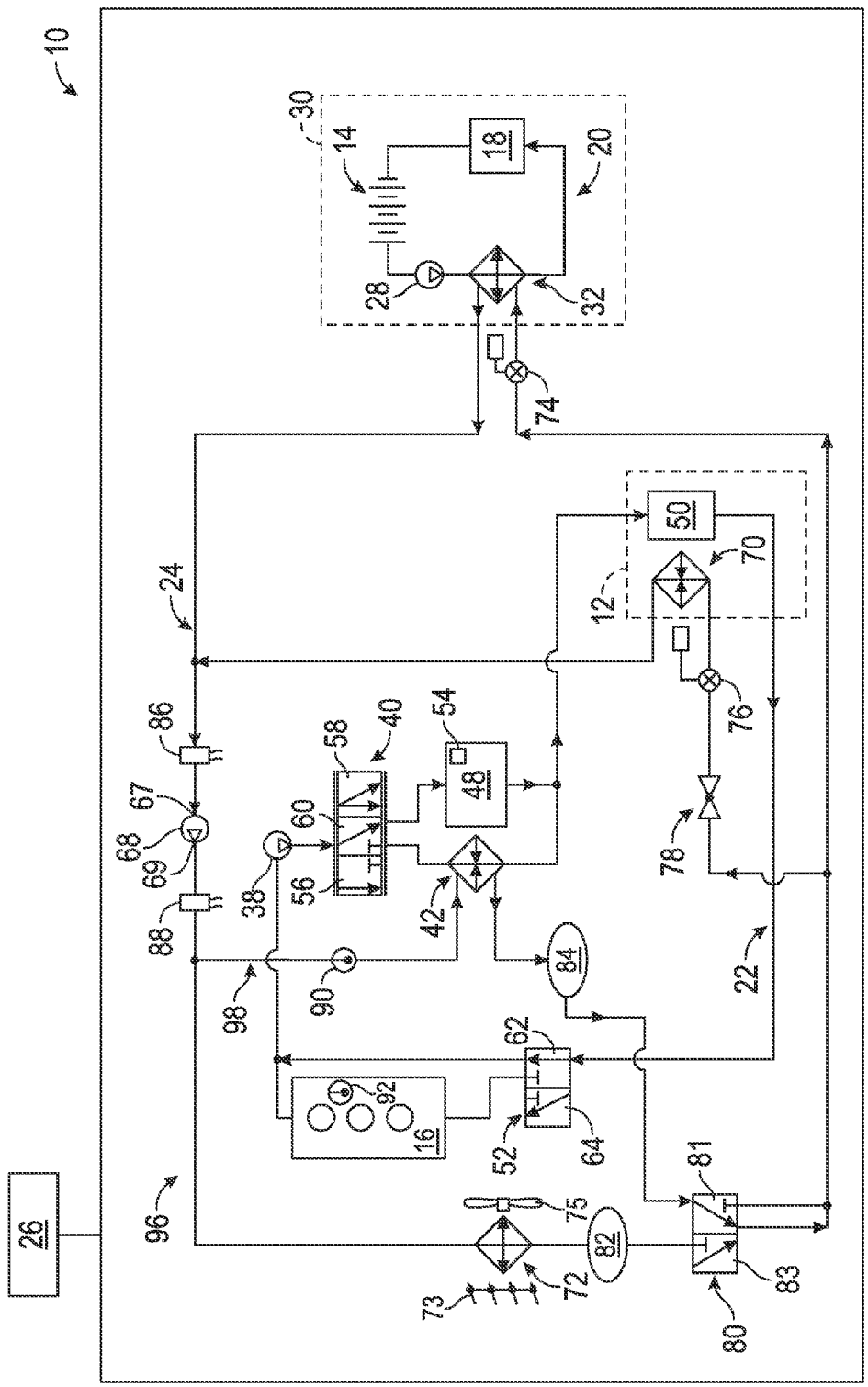
FIG. 3A is a schematic circuit diagram of the first example embodiment of the thermal management system operating in a maximum performance mode, wherein flow of the first coolant through the first coolant circuit is directed, via the CHCM mixing valve, exclusively through the CHCM, and wherein the first coolant circuit is not linked with the vehicle engine.
Figure 3B:
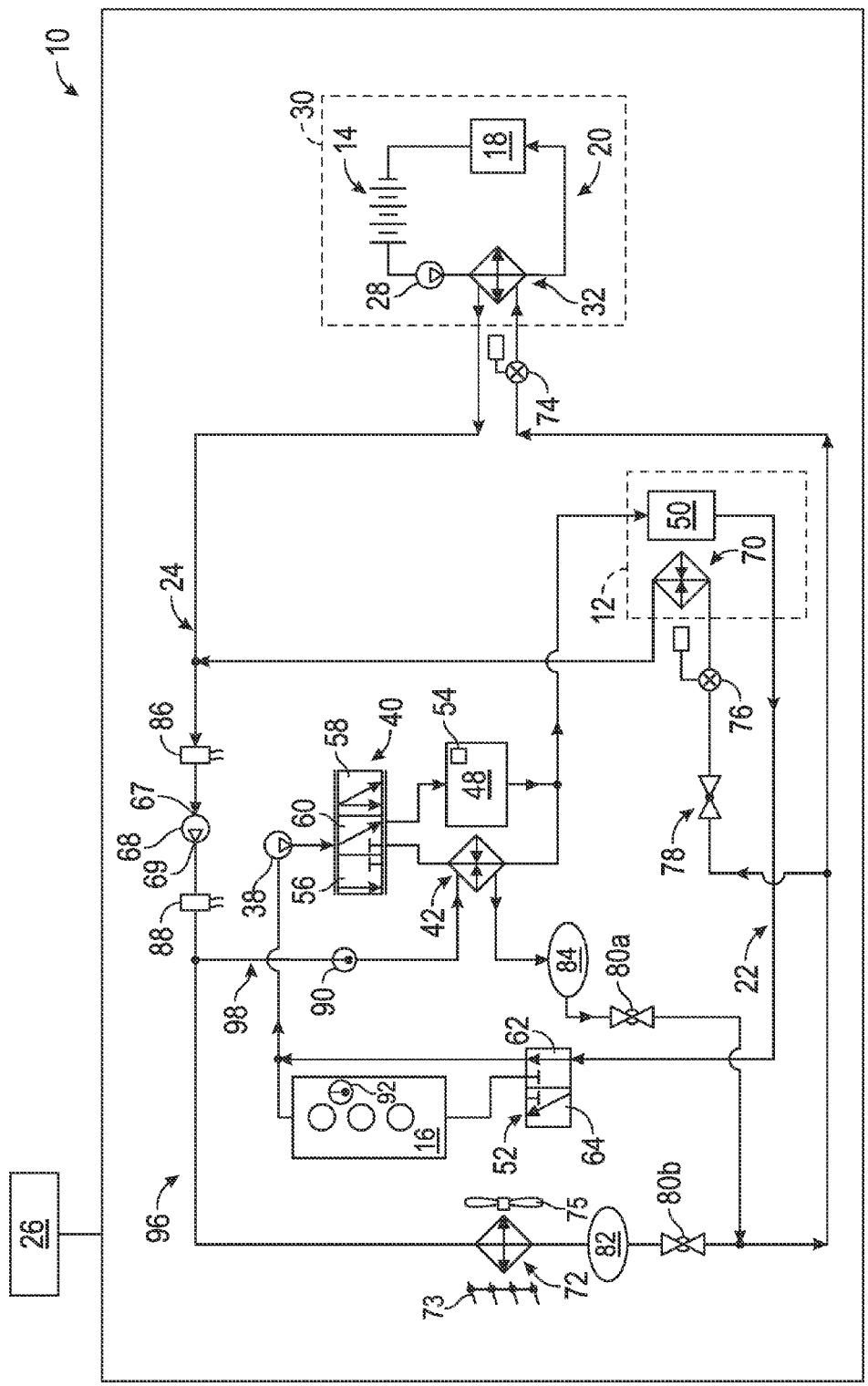
FIG. 3B is a schematic circuit diagram of the second example embodiment of the thermal management system operating in the maximum performance mode, wherein flow of the first coolant through the first coolant circuit is directed, via the CHCM mixing valve, exclusively through the CHCM, and wherein the first coolant circuit is not linked with the vehicle engine.
Figure 4A:
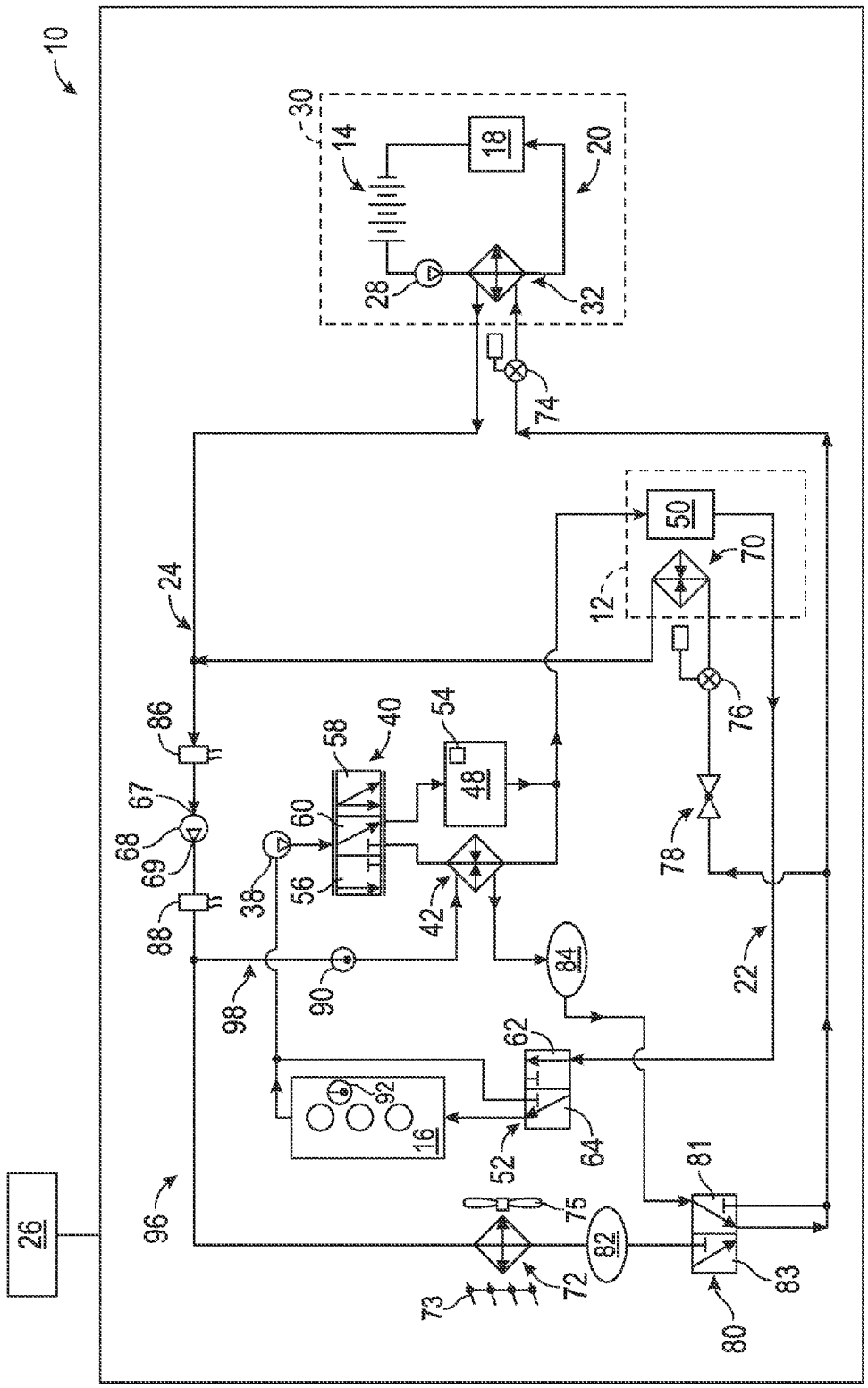
FIG. 4A is a schematic circuit diagram of the first example embodiment of the thermal management system operating in the maximum performance mode, wherein flow of the first coolant through the first coolant circuit is directed, via the CHCM mixing valve, exclusively through the CHCM, and wherein the first coolant circuit is linked with the vehicle engine.
Figure 4B:
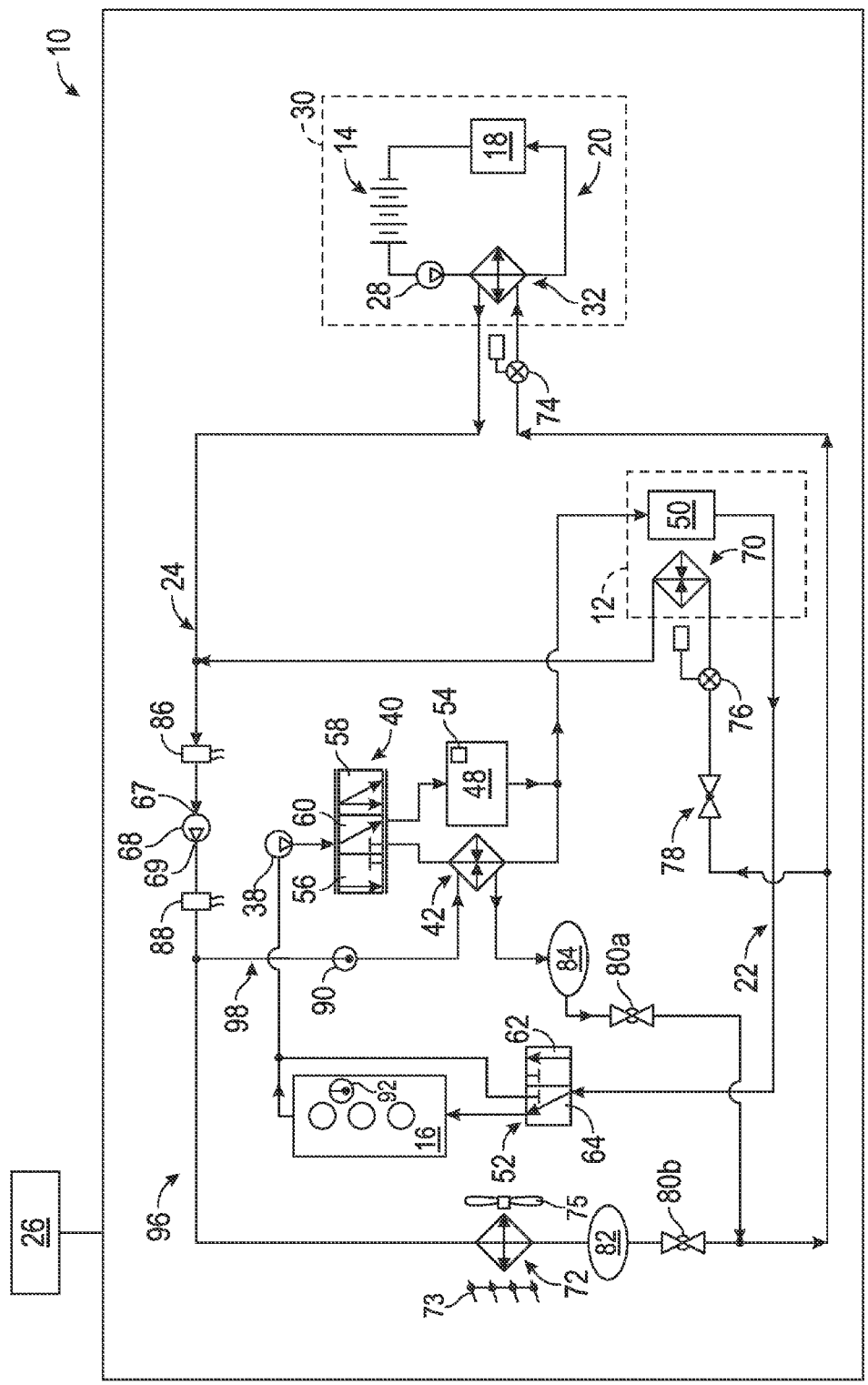
FIG. 4B is a schematic circuit diagram of the second example embodiment of the thermal management system operating in the maximum performance mode, wherein flow of the first coolant through the first coolant circuit is directed, via the CHCM mixing valve, exclusively through the CHCM, and wherein the first coolant circuit is linked with the vehicle engine.
Figure 5A:
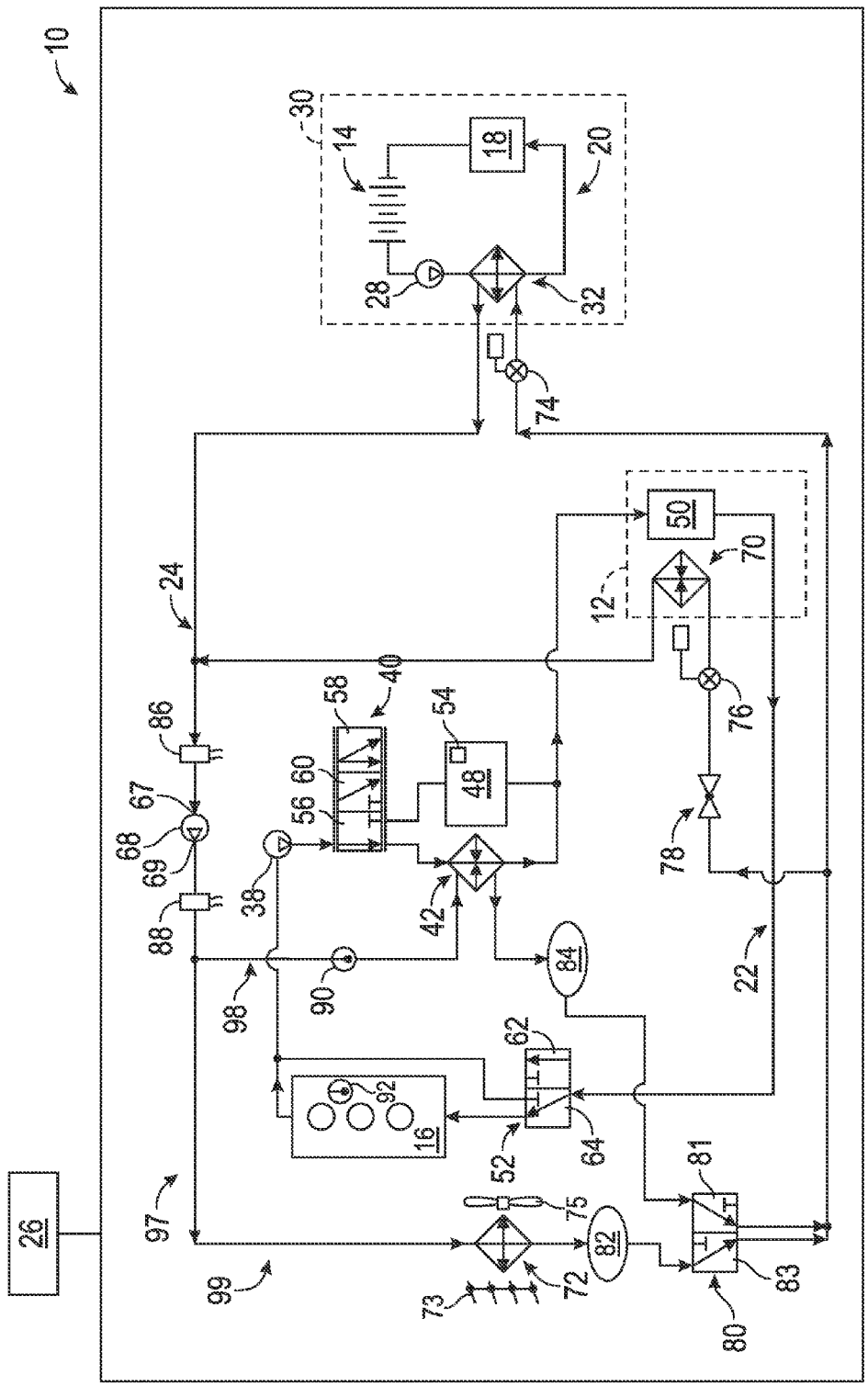
FIG. 5A is a schematic circuit diagram of the first example embodiment of the thermal management system operating in a propulsion system energy improvement mode, wherein flow of the first coolant through the first coolant circuit is directed, via the CHCM mixing valve, exclusively to the first coolant circuit heat exchanger, and wherein the first coolant circuit is linked with the vehicle engine.
Figure 5B:
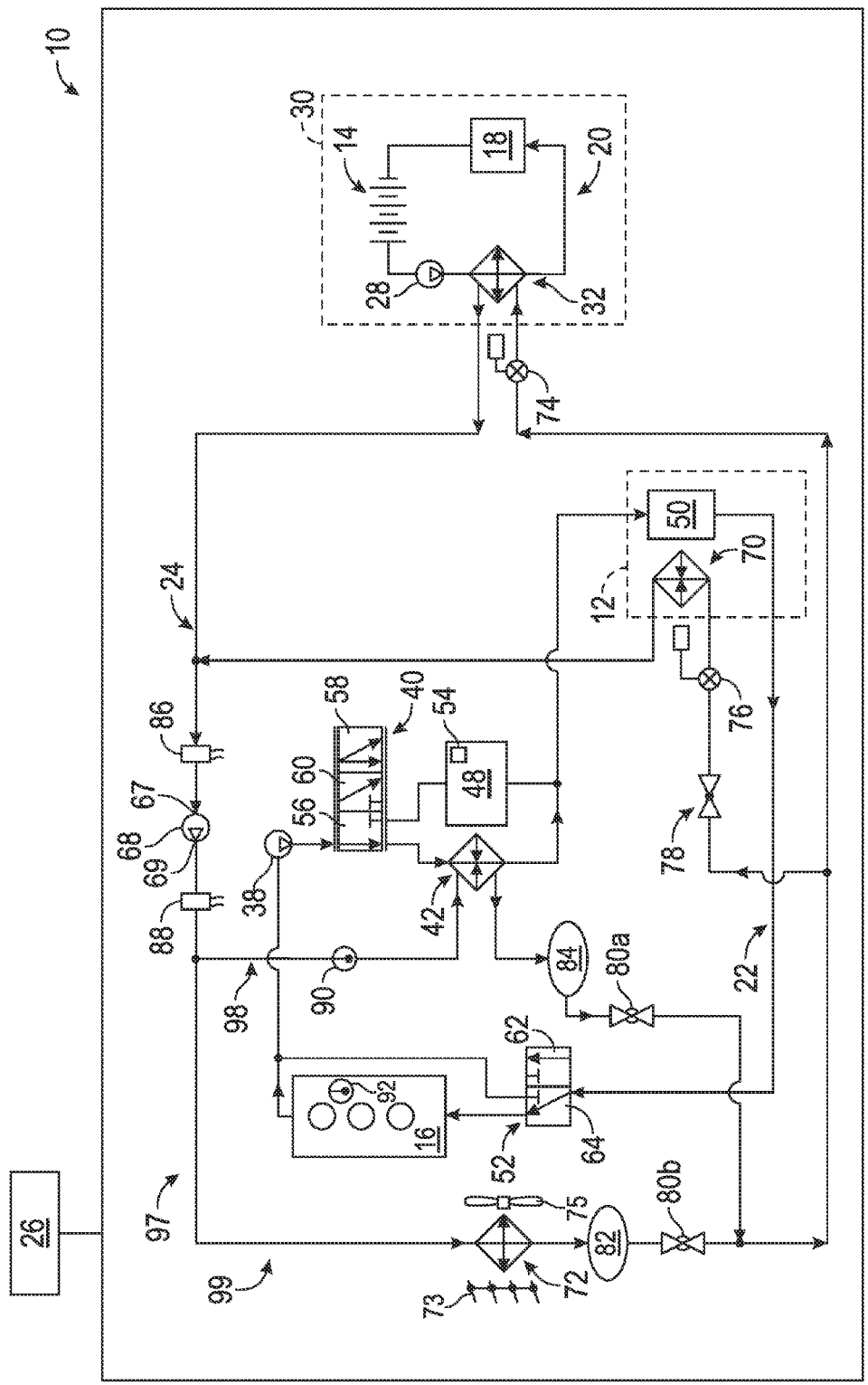
FIG. 5B is a schematic circuit diagram of the second example embodiment of the thermal management system operating in the propulsion system energy improvement mode, wherein flow of the first coolant through the first coolant circuit is directed, via the CHCM mixing valve, exclusively to the first coolant circuit heat exchanger, and wherein the first coolant circuit is linked with the vehicle engine.

The thermal management system 10 is described herein and shown in FIGS. 1A-5B with respect to a variety of configurations and four operating modes, i.e., high efficiency mode 94 (FIGS. 1A-1B), heat pump assist mode 95 (FIGS. 2A-2B), maximum performance mode 96 (FIGS. 3A, 3B, 4A, 4B), and propulsion system energy improvement mode 97 (FIGS. 5A-5B).

Referring generally to FIGS. 1A-5B, the thermal management system 10 may include a first coolant circuit 22, second coolant circuit 20, a refrigerant circuit 24, and a controller 26.

The first coolant circuit 22 is configured to circulate a first coolant, to condition air to be received by a vehicle passenger compartment 12, and to moderate the temperature of the engine 16. The first coolant circuit 22 may include the engine 16, a first coolant pump 38, a first coolant circuit heat exchanger 42, a Coolant Heater Control Module (CHCM) 48, a CHCM mixing valve 40, a heater core 50, and a bypass valve 52.

The first coolant pump 38 is configured to pump and/or circulate the first coolant through the first coolant circuit 22. For example, the first coolant pump 38 may circulate the first coolant between the first coolant circuit heat exchanger 42, the CHCM 48, the heater core 50, and optionally the engine 16. The first coolant pump 38 may be an electrical, mechanical, a hybrid electrical-mechanical pump, or the like.

The first coolant circuit heat exchanger 42 exchanges heat between the first coolant circulating in the first coolant circuit 22 and the refrigerant circulating through the refrigerant circuit 24. The first coolant circuit heat exchanger 42 may have a first coolant cavity and a first refrigerant cavity. The first coolant circuit heat exchanger 42 may thereby exchange heat between the first coolant flowing through the first coolant cavity and the refrigerant flowing through the first refrigerant cavity. The first coolant circuit heat exchanger 42 may function as a condenser, such that the first coolant circuit heat exchanger 42 may extract heat from the pressurized refrigerant as it flows therethrough to the extent that the pressurized refrigerant is cooled and condensed. The heat extracted from the refrigerant as it flows through the first coolant circuit heat exchanger 42 may be transferred to the first coolant flowing therethrough. The first coolant circuit heat exchanger 42 is further configured to expel the first coolant to the heater core 50.

The CHCM 48 is configured to heat the first coolant in order to provide additional heat to the passenger compartment 12 or to warm the engine 16 during cold start. The CHCM includes a high voltage heating element 54, capable of heating the first coolant. The high voltage heating element 54 may be a 360 volt electric heater or the like.

The CHCM mixing valve 40 is configured to receive the first coolant from the first coolant pump 38 and expel the first coolant to one or both of the first coolant circuit heat exchanger 42 and the CHCM 48, depending on the selected operating mode of the thermal management system 10. The CHCM mixing valve 40 modulates flow of the first coolant between the CHCM 48 and the first coolant circuit heat exchanger 42. The CHCM mixing valve 40 is a multi-envelope infinite position mixing valve capable of allocating flow of the first coolant between the first coolant circuit heat exchanger 42 and the CHCM 48 along a full spectrum of proportional allocations.

Figure 1A:
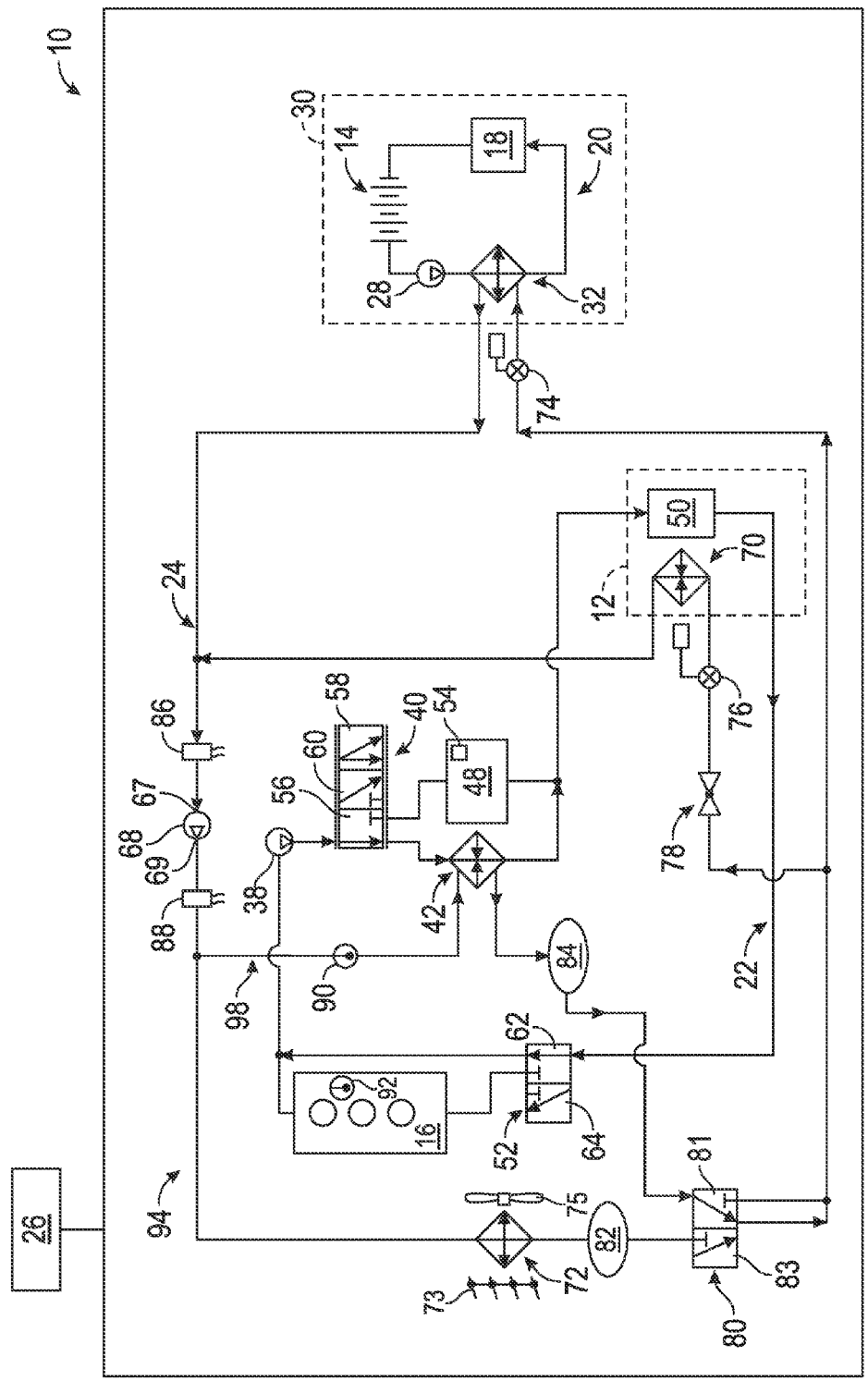
FIG. 1A is a schematic circuit diagram of a first example embodiment of a thermal management system operating in a high efficiency mode, wherein flow of a first coolant through a first coolant circuit is directed, via a Coolant Heater Control Module (CHCM) mixing valve, exclusively to a first coolant circuit heat exchanger, and wherein the first coolant circuit is not linked with a vehicle engine.
Figure 1B:
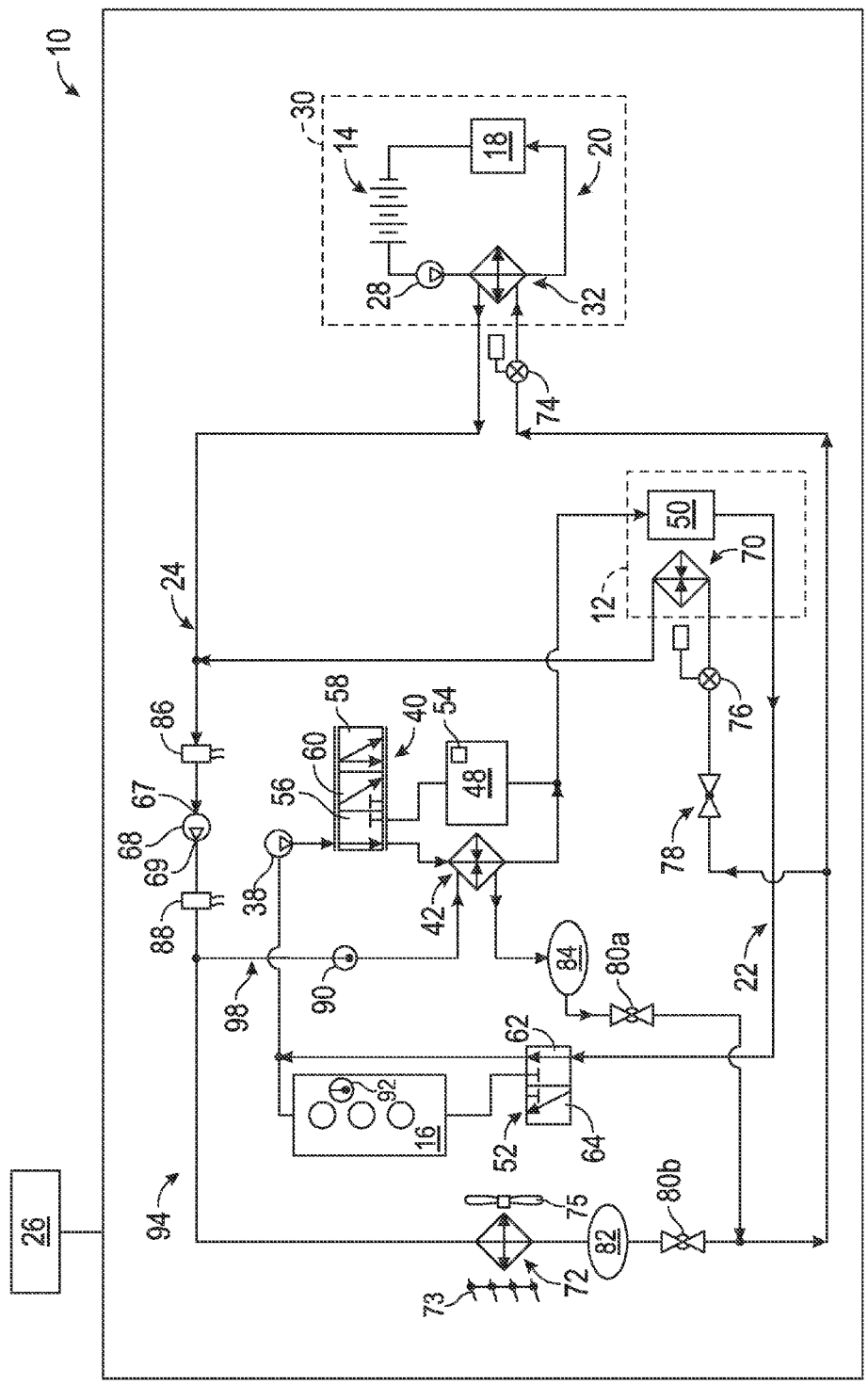
FIG. 1B is a schematic circuit diagram of a second example embodiment of the thermal management system operating in the high efficiency mode, wherein flow of the first coolant through the first coolant circuit is directed, via the CHCM mixing valve, exclusively to the first coolant circuit heat exchanger, and wherein the first coolant circuit is not linked with the vehicle engine.
Figure 2A:
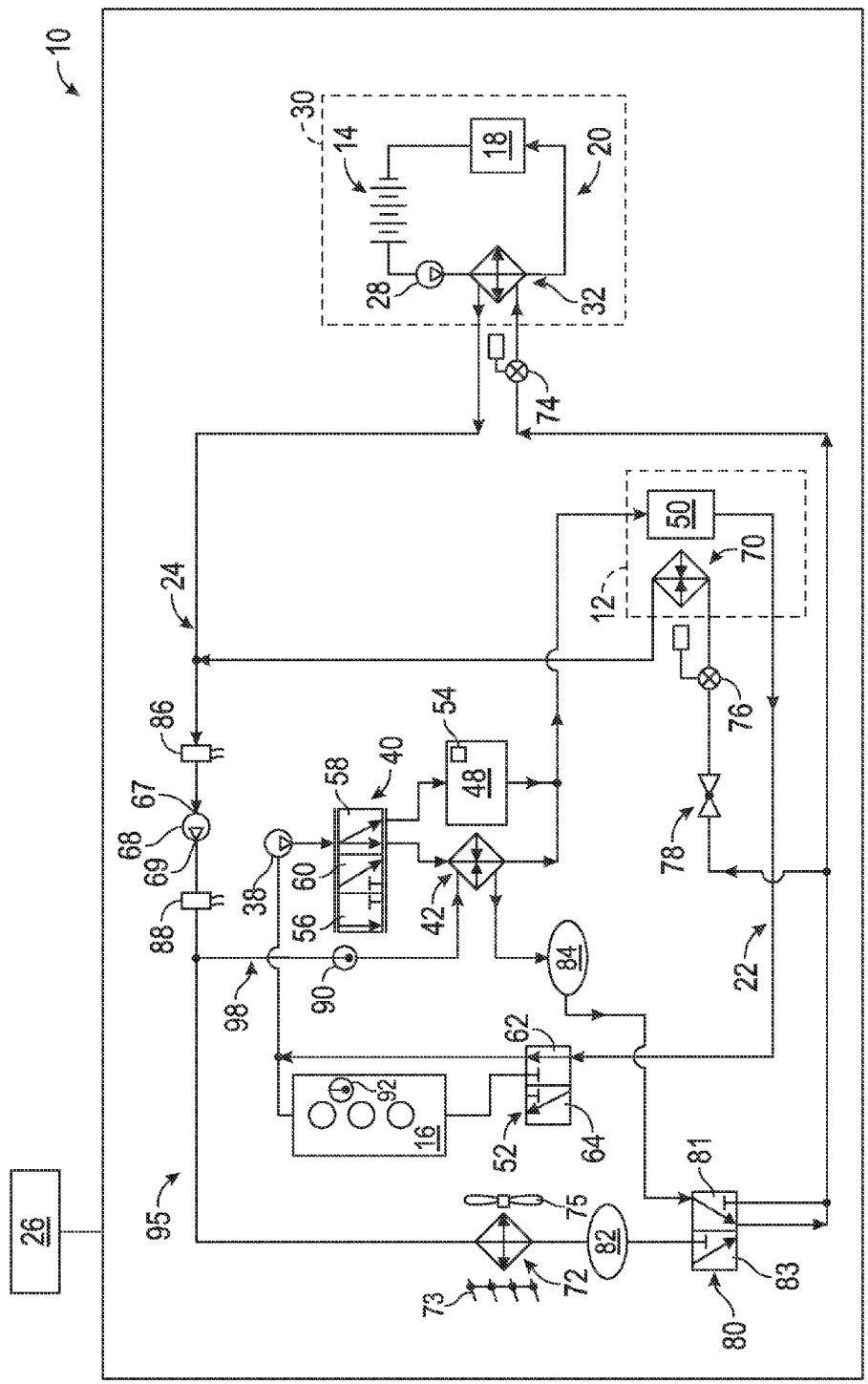
FIG. 2A is a circuit schematic diagram of the first example embodiment of the thermal management system operating in a heat pump assist mode, wherein flow of the first coolant through the first coolant circuit is modulated, via the CHCM mixing valve, between the first coolant circuit heat exchanger and a Coolant Heater Control Module (CHCM), and wherein the first coolant circuit is not linked with the vehicle engine.
Figure 2B:
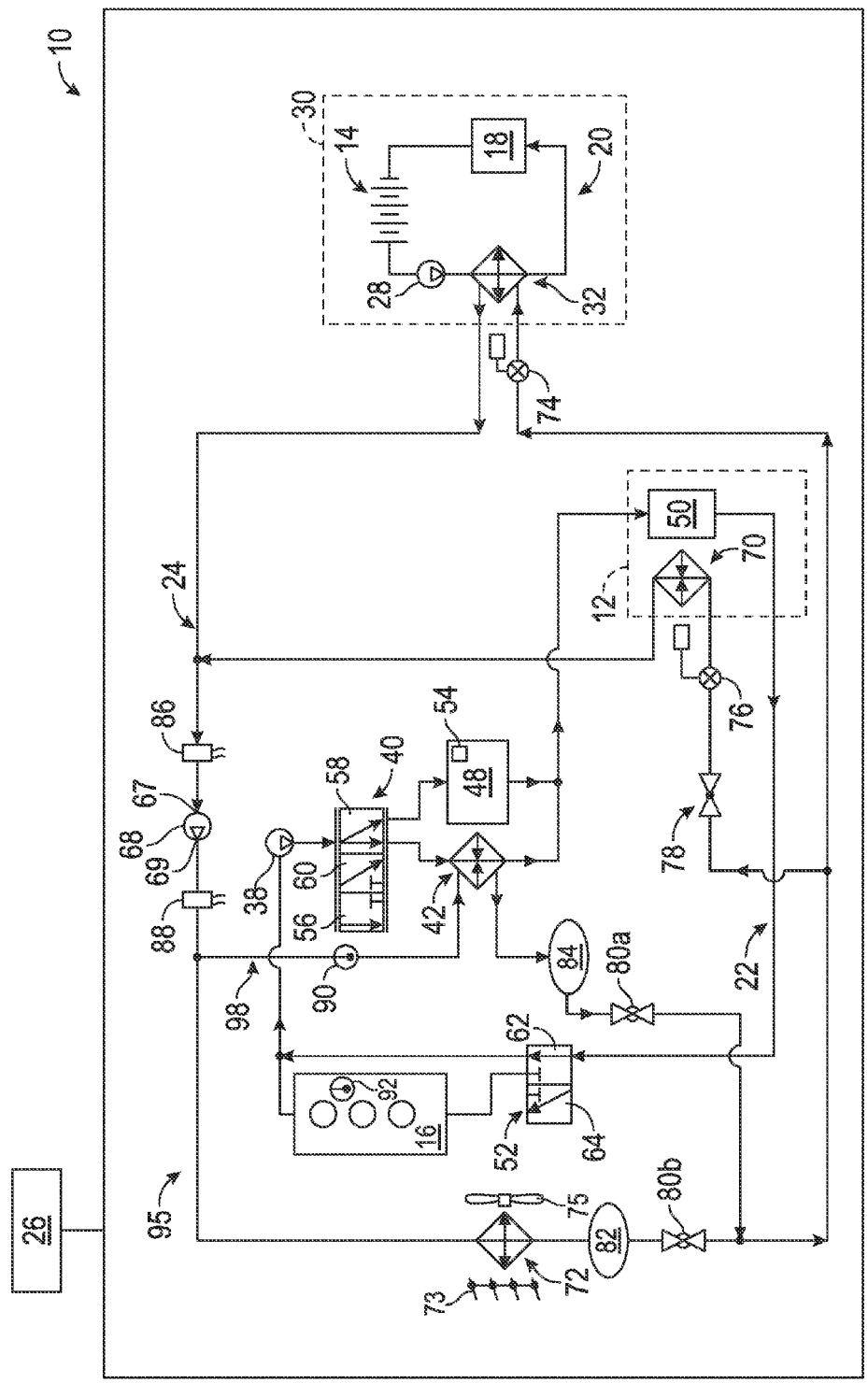
FIG. 2B is a schematic circuit diagram of the second example embodiment of the thermal management system operating in the heat pump assist mode, wherein flow of the first coolant through the first coolant circuit is modulated, via the CHCM mixing valve, between the first coolant circuit heat exchanger and the CHCM, and wherein the first coolant circuit is not linked with the vehicle engine.

The CHCM mixing valve 40 may further be configured to occupy one of a first position 56, a second position 58, and a third position 60. When actuated by the controller 26 to occupy the first position 56, the CHCM mixing valve 40 directs flow of the first coolant exclusively to the first coolant circuit heat exchanger 42. The CHCM mixing valve 40 occupies the first position 56, when the thermal management system 10 operates in the high efficiency mode 94, as shown in FIGS. 1A and 1B and when the thermal management system 10 operates in the propulsion system energy improvement mode 97, as shown in FIGS. 5A and 5B. When actuated by the controller 26 to occupy the second position 58, the CHCM mixing valve 40 modulates flow between the first coolant circuit heat exchanger 42 and the CHCM 48, thereby directing flow of the first coolant to each of the first coolant circuit heat exchanger 42 and the CHCM 48. The CHCM mixing valve 40 occupies the second position 58, when the thermal management system 10 operates in the heat pump assist mode 95, as shown in FIGS. 2A and 2B. When actuated by the controller 26 to occupy the third position 60, the CHCM mixing valve 40 directs flow of the first coolant exclusively to the CHCM 48. The CHCM mixing valve 40 occupies the third position 60, when the thermal management system 10 operates in the maximum performance mode 96, as shown in FIGS. 3A, 3B, 4A, and 4B.

The heater core 50 is configured to heat air flowing across the heater core 50 and into the vehicle passenger compartment 12. The heater core 50 may be configured to receive the first coolant and allow the first coolant to pass therethrough. The heater core 50 may be further configured to expel the first coolant to the bypass valve 52. The heater core 50 may receive the first coolant from one or both of the first coolant circuit heat exchanger 42 and the CHCM 48, depending upon the position of the CHCM mixing valve 40. When the thermal management system 10 operates in the high efficiency mode 94, as shown in FIGS. 1A and 1B and when the thermal management system 10 operates in the propulsion system energy improvement mode 97, as shown in FIGS. 5A and 5B, the heater core 50 receives the first coolant exclusively from the first coolant circuit heat exchanger 42. When the thermal management system 10 operates in the heat pump assist mode 95, as shown in FIGS. 2A and 2B, the heater core 50 receives the first coolant from each of the first coolant circuit heat exchanger 42 and the CHCM 48. When the thermal management system 10 operates in the maximum performance mode 96, as shown in FIGS. 3A, 3B, 4A, and 4B, the heater core 50 receives the first coolant exclusively from the CHCM 48.

The bypass valve 52 is configured to receive the first coolant from the heater core 50, and further configured to direct the first coolant to one of the first coolant pump 38 and the engine 16. The bypass valve 52 may be actuated by the controller 26 to occupy one of a bypass position 62 and a linked position 64. When the bypass valve 52 occupies the bypass position 62, the bypass valve 52 directs flow of the first coolant exclusively to the first coolant pump 38, thereby routing the first coolant to bypass the engine 16. When the bypass valve 52 occupies the linked position 64, the bypass valve 52 directs the flow of the first coolant exclusively to the engine 16, linking the first coolant circuit 22 with the engine 16.

When the thermal management system 10 operates in the high efficiency mode 94, as shown in FIGS. 1A and 1B and the heat pump assist mode 95, as shown in FIGS. 2A and 2B, the bypass valve 52 occupies the bypass position 62. When the thermal management system 10 operates in the maximum performance mode 96, as shown in FIGS. 3A and 3B, the bypass valve 52 occupies the bypass position 62. When the thermal management system 10 operates in the maximum performance mode 96, as shown in FIGS. 4A and 4B the bypass valve 52 occupies the linked position 64. When the thermal management system 10 operates in the propulsion system energy improvement mode 97, shown in FIGS. 5A and 5B, the bypass valve 52 occupies the linked position 64.

The second coolant circuit 20 is configured to circulate a second coolant to moderate the temperature of, i.e., heat or cool, the vehicle battery 14. The second coolant circuit 20 may circulate the second coolant within a Rechargeable Energy Storage System (RESS) 30. The second coolant circuit 20 may include a second coolant pump 28, the vehicle battery 14, and a second coolant circuit heat exchanger 32. The second coolant circuit 20 may also optionally include a battery heater 18.

The second coolant pump 28 is configured to pump and/or circulate the second coolant through the second coolant circuit 20. For example, the second coolant pump 28 may circulate the second coolant through the RESS 30 and the second coolant circuit heat exchanger 32. The second coolant pump 28 may be an electrical, mechanical, or hybrid electrical-mechanical pump or the like.

The RESS 30 houses the vehicle battery 14 and other vehicle power electronics. The second coolant may circulate through the RESS 30 to moderate the temperature of the vehicle battery 14 and power electronics, i.e., cool the vehicle battery 14 and power electronics during vehicle operation and warm the vehicle battery 14 and power electronics during charging or in cold ambient temperatures in order to assist the battery 14 and power electronics in reaching a suitable operating temperature.

The second coolant circuit heat exchanger 32 exchanges heat between the second coolant circulating through the second coolant circuit 20 and the refrigerant circulating through the refrigerant circuit 24. The second coolant circuit heat exchanger 32 may have a second coolant cavity and a second refrigerant cavity. The second coolant circuit heat exchanger 32 may thereby exchange heat between the second coolant flowing through the second coolant cavity and the refrigerant flowing through the second refrigerant cavity. The second coolant circuit heat exchanger 32 may function as an evaporator to dissipate heat from the second coolant to the refrigerant.

The battery heater 18, may be a 12-volt electric heater or the like, configured to heat the vehicle battery 14 and the other power electronics within the RESS 30 to a suitable operating temperature in cold ambient temperatures.

The refrigerant circuit 24 is configured to circulate a refrigerant and condition air to be received by the passenger compartment 12. The refrigerant circuit 24 is further configured to operate in one of a first mode 98 and a second mode 99. In first mode 98, the refrigerant circuit 24 may be configured to heat and dehumidify the air to be received by the passenger compartment 12. In second mode 99, the refrigerant circuit 24 may be configured to cool and dehumidify the air to be received by the passenger compartment 12.

The refrigerant circuit 24 may include a compressor 68, the first coolant circuit heat exchanger 42, the second coolant circuit heat exchanger 32, a cabin evaporator 70, an AC condenser 72, a first expansion device 74, a second expansion device 76, at least one flow control valve 78, at least one mode selection valve 80, a first receiver dryer 84, and a second receiver dryer 82. The refrigerant circuit 24 may also include evaluation devices such as a high-side pressure sensor 88, a low-side pressure sensor 86, and a refrigerant temperature sensor 90.

The compressor 68 is configured to compress the refrigerant and circulate the refrigerant through the refrigerant circuit 24. The compressor 68 may have an inlet 67 and an outlet 69. The compressor 68 may be driven by an electric motor (not shown), which may be of the single or variable speed variety. The compressor 68 may also be a pump driven by a belt (not shown) connected to the engine 16. The compressor 68 pressurizes the refrigerant into a high-pressure state and expels compressed refrigerant to one of the first coolant circuit heat exchanger 42 and the AC condenser 72.

At least one low-side refrigerant pressure sensor 86 may be positioned on the low-pressure side of the compressor 68 proximate the compressor inlet 67. An at least one high-side refrigerant pressure sensor 88 may be positioned on the high-pressure side of the compressor 68 proximate the compressor outlet 69.

When the refrigerant circuit 24 operates in the first mode 98, the compressor 68 expels refrigerant exclusively to the first coolant circuit heat exchanger 42. When the refrigerant circuit 24 operates in the second mode 99, the compressor 68 expels refrigerant exclusively to the AC condenser 72.

Mode selection of either the first mode 98 or the second mode 99 is governed by the controller 26 and the actuated position of the at least one mode selection valve 80. The at least one mode selection valve 80 is configured to occupy one of a first position 81 and a second position 83. When the controller signals the refrigerant circuit 24 to operate in the first mode 98, the controller 26 then actuates the at least one mode selection valve 80 to occupy the first position 81, such that the refrigerant from the compressor 68 is directed exclusively to the first coolant circuit heat exchanger 42 (FIGS. 1A-4B). When the controller 26 signals the refrigerant circuit 24 to operate in the second mode 99, the controller 26 actuates the at least one mode selection valve 80 to occupy the second position 83, such that the refrigerant from the compressor 68 is directed exclusively to the AC condenser 72 (FIGS. 5A-5B).

In a first example embodiment, shown in FIGS. 1A, 2A, 3A, 4A, and 5A, the at least one mode selection valve 80 is embodied as a three way two-position valve having a first position 81 and a second position 83. In the first mode 98, the mode selection valve 80 occupies the first position 81 and in the second mode 99, the at least one mode selection valve 80 occupies the second position 83.

In a second example embodiment, shown in FIGS. 1B, 2B, 3B, 4B, and 5B, the at least one mode selection valve is embodied as two shut-off valves, the first shut-off valve 80a is positioned downstream of the first coolant circuit heat exchanger 42 and the second shut-off valve 80b is positioned downstream of the AC condenser 72. In the first mode 98, the first shut-off valve 80a and the second shut-off valve 80b occupy a first position, i.e., the first shut-off valve 80a is fully open and the second shut-off valve 80b is fully closed. In the second mode 99, the first shut-off valve 80a and the second shut-off valve 80b occupy a second position, i.e., the first shut-off valve 80a is fully closed and the second shut-off valve 80b is fully open.

In the first mode 98, the compressor 68 expels refrigerant to the first coolant circuit heat exchanger 42. Refrigerant expelled from the compressor 68 to the first coolant circuit heat exchanger 42 passes a refrigerant temperature sensor 90, which evaluates the temperature of the refrigerant flowing through the refrigerant circuit 24, particularly the refrigerant entering the first coolant circuit heat exchanger 42. The refrigerant temperature sensor 90 then sends a signal, representing the temperature of the refrigerant, back to the controller 26.

The first coolant circuit heat exchanger 42, as described above, exchanges heat between the first coolant circulating in the first coolant circuit 22 and the refrigerant circulating through the refrigerant circuit 24. The first coolant circuit heat exchanger 42 may function as a condenser, such that the first coolant circuit heat exchanger 42 may extract heat from the pressurized refrigerant as it flows therethrough. The heat extracted from the refrigerant as it flows through the first coolant heat exchanger 42 may be transferred to the first coolant also flowing therethrough. The first coolant circuit heat exchanger 42 may be further configured to expel the refrigerant to a first receiver dryer 84.

The first receiver dryer 84 may have an inlet and an outlet. The first receiver dryer 84 may further include a plurality of desiccants (not shown) to attract and remove moisture from the refrigerant flowing through the refrigerant circuit 24. The first receiver dryer 84 may receive the refrigerant at the receiver dryer inlet and expel the refrigerant from the receiver dryer outlet to one of a first expansion device 74 and a second expansion device 76.

The at least one flow control valve 78 is configured to meter and/or modulate flow of the refrigerant between the first expansion device 74 and the second expansion device 76.

The first and second expansion devices 74, 76 may be further configured to allow liquid refrigerant to expand as it passes therethrough, resulting in a decrease in temperature of the refrigerant. Refrigerant is expelled from the first expansion device 74 to the second coolant circuit heat exchanger 32. Refrigerant is expelled from the second expansion device 76 to the cabin evaporator 70. The first and second expansion devices 74, 76 may be thermal expansion valves, which may be either electronic or mechanical. The first and second expansion devices 74, 76 may monitor, such as with a sensor or a bulb, the temperature of the refrigerant leaving each of the second coolant circuit heat exchanger 32 and the cabin evaporator 70, and may improve the performance of the heat exchange by expelling more or less refrigerant into the second coolant circuit heat exchanger 32 and cabin evaporator 70 respectively.

The first expansion device 74 may be further configured to expel refrigerant to the second coolant circuit heat exchanger 32. The second expansion device 76 may be configured to expel refrigerant to the cabin evaporator 70.

The second coolant circuit heat exchanger 32, as described above, exchanges heat between the second coolant circulating in the second coolant circuit 20 and the refrigerant circulating in the refrigerant circuit 24. The second coolant circuit heat exchanger 32 thereby exchanges heat between the second coolant and the refrigerant flowing therethrough. The second coolant circuit heat exchanger 32 may function as an evaporator. The second coolant circuit heat exchanger 32 may be further configured to expel refrigerant back to the compressor 68 to complete the refrigerant circuit 24.

The cabin evaporator 70 is configured to exchange heat between the refrigerant and the air flowing across the cabin evaporator 70 and into the passenger compartment 12 to cool and dehumidify the passenger compartment 12. The cabin evaporator 70 may function as an evaporator. The cabin evaporator 70 may be further configured to expel refrigerant back to the compressor 68 to complete the refrigerant circuit 24.

In the second mode 99, the compressor 68 expels refrigerant to the AC condenser 72. The AC condenser 72 exchanges heat between the refrigerant and an ambient environment. The AC condenser 72 may be a refrigerant-to-air condenser. The AC condenser 72 may receive pressurized refrigerant from the compressor 68 and may cool and condense the pressurized refrigerant as it flows therethrough. The AC condenser 72 is configured to expel refrigerant to one of the first expansion device 74 and the second expansion device 76.

The first expansion device 74 may be further configured to expel refrigerant to the second coolant circuit heat exchanger 32. The second expansion device 76 may be configured to expel refrigerant to the cabin evaporator 70. The second coolant circuit heat exchanger 32 and the cabin evaporator 70 and each expel refrigerant back to the compressor 68 as described above to complete the refrigerant circuit 24.

Referring to the controller 26, generally shown in FIGS. 1A-5B, the controller 26 includes a processor and tangible, non-transitory memory on which is recorded instructions. Executing the recorded instructions causes the processor to actuate the CHCM mixing valve 40 and the bypass valve 52 to predetermined positions to effectuate a selected mode of operation for the thermal management system, wherein the selected mode of operation is one of a high efficiency mode 94, a heat pump assist mode 95, a maximum performance mode 96, and propulsion system energy improvement mode 97.

The controller 26 may be a stand-alone unit, or be part of an electronic controller that regulates the operation of the vehicle including the engine 16 and the thermal management system 10. The controller 26 may be embodied as a server/host machine or distributed system, e.g., a digital computer or microcomputer, acting as a vehicle control module, and/or as a proportional-integral-derivative (PID) controller device having a processor, and tangible, non-transitory memory such as read-only memory (ROM) or flash memory. The controller 26 may also have random access memory (RAM), electrically erasable programmable read only memory (EE-PROM), a high-speed clock, analog-to-digital (A/D) and/or digital-to-analog (D/A) circuitry, and any required input/output circuitry and associated devices, as well as any required signal conditioning and/or signal buffering circuitry.

In general, computing systems and/or devices, such as the controller 26, may employ any of a number of computer operating systems and generally include computer-executable instructions, where the instructions may be executable by one or more computing devices such as those listed above. Computer-executable instructions may be compiled or interpreted from computer programs created using a variety of well-known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

Therefore, the controller 26 can include all software, hardware, memory, algorithms, connections, sensors, etc., necessary to control and effectuate the operation of the thermal management system 10.

Figure 6:
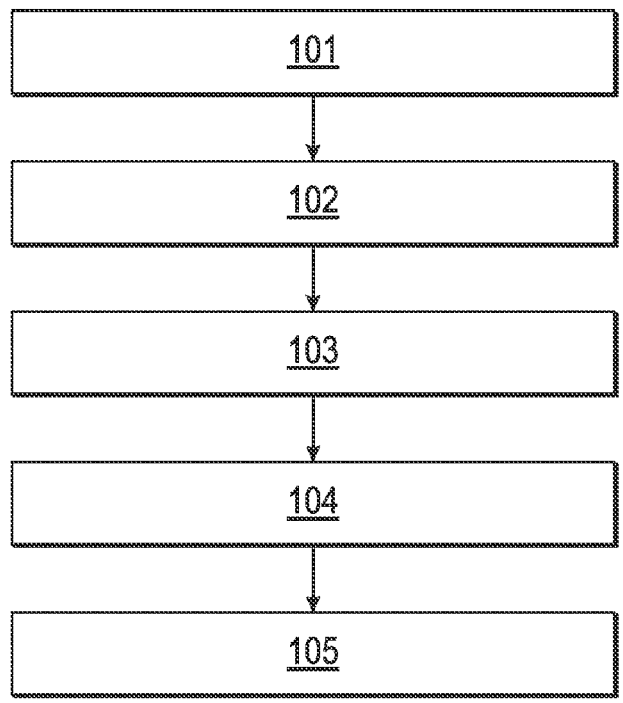
FIG. 6 is a flow chart detailing example steps of the present method of controlling the thermal management system.

As schematically displayed in FIG. 6, execution of the recorded instructions causes the processor to complete the steps of the present method 100 to effectuate the operation of a provided thermal management system 10, including a first coolant circuit 22 configured to circulate a first coolant and a refrigerant circuit 24 configured to circulate a refrigerant, wherein the first coolant circuit 22 includes a first coolant pump 38, a first coolant circuit heat exchanger 42, and a Coolant Heater Control Module (CHCM) 48.

At step 101, the controller 26 selects a mode of operation for the thermal management system 10. The selected mode of operation is one of the high efficiency mode 94, the heat pump assist mode 95, the maximum performance mode 96, and the propulsion system energy improvement mode 97.

At step 102, the controller 26 signals the thermal management system 10 to operate in the selected mode of operation 94, 95, 96, 97.

At step 103, the controller 26 actuates the bypass valve 52 to occupy one of a bypass position 62 and a linked position 64.

At step 104, the controller 26 actuates CHCM mixing valve 40 to occupy one of a first position, a second position, and a third position.

At step 105, the controller 26 signals the refrigerant circuit 24 to operate in one of a first mode 98 and a second mode 99 based upon the selected mode of operation 94, 95, 96, 97. When the selected mode of operation is one of the high efficiency mode 94, the heat pump assist mode 95, and the maximum performance mode 96 the controller 26 signals the refrigerant circuit to operate in the first mode 98, thereby actuating the at least one mode selection valve 80 to the first position 81. Actuating the at least one mode selection valve 80 to the first position 81, resultantly, directs the refrigerant from the compressor 68 exclusively to the first coolant circuit heat exchanger 42.

Figure 7:
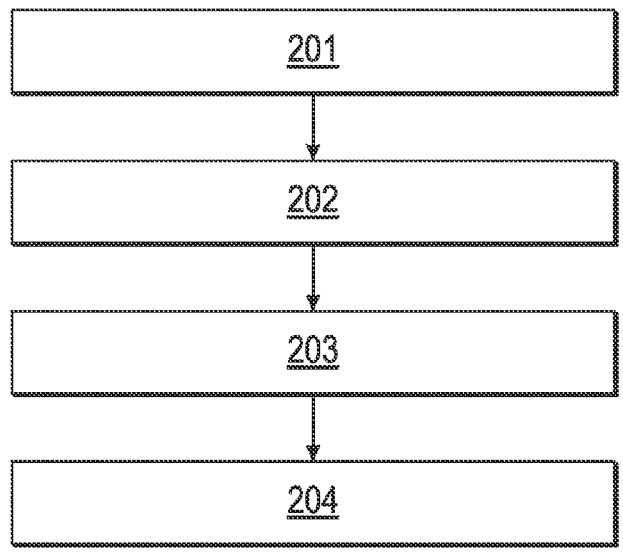
FIG. 7 is a flow chart further detailing the example method step of signaling the refrigerant circuit to operate in one of a first mode and a second mode.

FIG. 7 details step 105, i.e., signaling, via the controller 26, the refrigerant circuit 24 to operate in one of a first mode 98 and a second mode 99 based upon the selected mode of operation, when the selected mode of operation is the propulsion system energy improvement mode 97. When the selected mode of operation is the propulsion system energy improvement mode 97, the controller 26, at step 201, signals the refrigerant circuit 24 to operate in the first mode 98, until the engine 16 reaches a predetermined threshold temperature, thereby utilizing the engine 16 as a heat sink. Resultantly, the engine 16 is pre-warmed prior to an engine start event. While the refrigerant circuit 24 continues to operate in the first mode 98, the controller 26 may signal an at least one electric cooling fan 75 associated with the AC condenser 72 to remain off. Additionally, the controller 26 may actuate a plurality of vehicle aero shutters 73 to occupy a closed position, thereby reducing the electrical load and aerodynamic drag on the vehicle.

At step 202, the controller 26 evaluates the temperature of the engine 16 via an engine coolant temperature sensor 92.

At step 203, the controller 26 continuously compares the temperature of the engine 16 and the predetermined threshold temperature.

At step 204, the controller 26, signals the refrigerant circuit 24 to operate in the second mode 99, when the temperature of the engine 16 exceeds the predetermined threshold temperature. When the controller 26 signals the refrigerant circuit 24 to operate in the second mode 99, after the engine 16 reaches the predetermined threshold temperature, the controller 26 actuates the at least one mode selection valve 80 to the second position 83. Actuating the at least one mode selection valve 80 to the second position 83, resultantly, directs the refrigerant from the compressor 68 exclusively to the AC condenser 72. While the refrigerant circuit 24 operates in the second mode 99, the controller 26 may signal an at least one electric cooling fan 75 associated with the AC condenser 72 to power on. Additionally, the controller 26 may actuate a plurality of vehicle aero shutters 73 to occupy an open position.

Referring back to FIG. 6, in combination, steps 103, 104, and 105 of the present method define the selected operating mode of the thermal management system 10, selected at step 101. When the selected mode of operation is the high efficiency mode 94, as shown in FIGS. 1A and 1B, the controller 26 actuates the bypass valve 52 to occupy the bypass position 62 and direct flow of the first coolant exclusively to the first coolant pump 38, bypassing the engine 16. Further, the controller 26 actuates the CHCM mixing valve 40 to occupy the first position 56, such that the CHCM mixing valve 40 directs flow of the first coolant exclusively to the first coolant circuit heat exchanger 42. Further, the controller 26 signals the refrigerant circuit 24 to operate in the first mode 98.

The high efficiency mode 94 is a high efficiency heating mode, in which the passenger compartment 12 is heated via the refrigerant circuit 24 and the first coolant circuit 22. The high efficiency mode 94 is selected by the controller 26 when the passenger compartment 12 heating demand is moderate or low and the ambient temperature is mild, e.g., from about 0° C. to about 25° C.

When the selected mode of operation is the heat pump assist mode 95, as shown in FIGS. 2A and 2B, the controller 26 actuates the bypass valve 52 to occupy the bypass position 62 and direct flow of the first coolant exclusively to the first coolant pump 38, bypassing the engine 16. The controller 26 actuates the CHCM mixing valve 40 to occupy the second position 58, such that the CHCM mixing valve 40 directs flow of the first coolant to each of the first coolant circuit heat exchanger 42 and the CHCM 48. Further, the controller 26 signals the refrigerant circuit 24 to operate in the first mode 98.

The heat pump assist mode 95 is a combination heating mode, in which the thermal management system 10 employs the CHCM 48 to assist the refrigerant circuit 24 and the first coolant circuit 22 to provide heat to the passenger compartment 12. In mild ambient temperatures, performance of the heat pump created by the refrigerant circuit 24 and the first coolant circuit 22 alone may be insufficient, for example when 1) the heating demand from the passenger compartment 12 is high and the ambient temperature is mild, e.g., from about 0° C. to about 25° C.; and 2) heating demand from the passenger compartment 12 is moderate and the ambient temperature is mild to cold, e.g., from about −10° C. to about 0° C. In such an instance, the CHCM mixing valve 40 occupies the second position 58 to modulate flow of the first coolant through the first coolant circuit heat exchanger 42 and the CHCM 48, allowing the high voltage heating element 54 of the CHCM 48 to provide additional heat to the passenger compartment 12, via the first coolant.

When the selected mode of operation is the maximum performance mode 96, shown in FIGS. 3A, 3B, 4A, 4B the controller 26 actuates the bypass valve 52 to occupy one of the bypass position 62 and the linked position 64. Further, the controller 26 actuates the CHCM mixing valve 40 to occupy the third position 60, such that the CHCM mixing valve 40 directs flow of the first coolant exclusively to the CHCM 48. Further, the controller 26 signals the refrigerant circuit 24 to operate in the first mode 98. The maximum performance mode 96 is a heating mode in which the heat pump created by the refrigerant circuit 24 and the first coolant circuit 22 is unavailable due to cold ambient temperatures.

During cold start of the engine 16, in the maximum performance mode 96, as shown in FIGS. 3A and 3B, the controller 26 actuates the bypass valve 52 to occupy the bypass position 62 and direct flow of the first coolant exclusively to the first coolant pump 38, bypassing the engine 16. In this instance, the temperature of the first coolant within the engine 16, as sensed by the engine coolant temperature sensor 92, is cooler than the temperature of the first coolant to be circulated through the first coolant circuit heat exchanger 42. As such, the high voltage heating element 54 of the CHCM 48 carries the full load of providing heat to the passenger compartment 12.

After the engine 16 has sufficiently warmed, and the selected mode of operation of the thermal management system 10 is the maximum performance mode 96, as shown in 4A, 4B, the controller 26 actuates the bypass valve 52 to occupy the linked position 64 and direct flow of the first coolant exclusively to the engine 16. In this instance, the temperature of the engine 16, as sensed by the engine coolant temperature sensor 92, is warmer than the temperature of the first coolant to be circulated through the first coolant circuit heat exchanger 42. As such, the first coolant carries engine waste heat that may be utilized to aid in heating the passenger compartment 12. In tandem, the high voltage heating element 54 of the CHCM 48 and waste heat from the engine 16 provide maximum heating to the passenger compartment 12 at ambient temperatures below about 0° C.

When the selected mode of operation is the propulsion system energy improvement mode 97, shown in FIGS. 5A and 5B, the controller actuates the bypass valve 52 to occupy the linked position 64 and direct flow of the first coolant exclusively to the engine 16. Further, the controller 26 actuates the CHCM mixing valve 40 to occupy the first position 56, such that the CHCM mixing valve 40 directs flow of the first coolant exclusively to the first coolant circuit heat exchanger 42. Further, as detailed in FIG. 7 and described above, the controller 26 signals the refrigerant circuit 24 to operate in one of the first mode 98 and the second mode 99.

The propulsion system energy improvement mode 97 is available at any ambient temperature, when there is a cooling demand from the passenger compartment 12. In the propulsion system energy improvement mode 97, the refrigerant circuit 24 initially continues to run in the first mode 98, wherein the refrigerant from the compressor 68 is routed exclusively to the first coolant circuit heat exchanger 42. The refrigerant running through the first coolant circuit heat exchanger 42 is warmer than the engine 16, and as such, the refrigerant circuit 24 and the first coolant circuit 22 may use the engine 16 as a heat sink for the heat created therein. Resultantly, the engine 16 is pre-warmed prior to an engine start event. While the refrigerant circuit 24 continues to operate in the first mode 98 the at least one electric cooling fan 75 associated with the AC condenser 72 may remain off and the plurality of vehicle aero shutters 73 may remain closed, thereby reducing the electrical load and aerodynamic drag on the vehicle.

Upon the initial start of the engine 16, the refrigerant circuit 24 will operate in the first mode 98 in order to route the refrigerant to the first coolant circuit heat exchanger 42, wherein the heat from the refrigerant will be dissipated to the first coolant circulating through the first coolant circuit 22. The first coolant will continue to circulate through the first coolant circuit 22 through the heater core 50 and then through the engine 16, delivering the additional heat from the refrigerant flowing through the first coolant circuit heat exchanger 42 to the engine 16 to efficiently warm the engine 16. Once the engine 16 warms, i.e., reaches a predetermined threshold temperature, the refrigerant circuit 24 is signaled by the controller 26 to operate in the second mode 99, routing refrigerant from the compressor 68 exclusively to the AC condenser 72. While the refrigerant circuit 24 operates in the second mode 99, the at least one electric cooling fan 75 associated with the AC condenser 72 may be powered on by the controller 26, and the plurality of vehicle aero shutters 73 may be actuated to an open position. The propulsion system energy improvement mode 97 is a mode in which the time required to warm the engine 16 may be decreased and electric load on the vehicle can be reduced to thereby increase fuel economy.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A thermal management system for a vehicle having an engine, the thermal management system comprising:
    a refrigerant circuit configured to circulate a refrigerant and further configured to operate in one of a first mode or a second mode;
    a first coolant circuit in heat exchange relation with the refrigerant circuit and configured to circulate a first coolant, the first coolant circuit including:
        a first coolant pump;
        a first coolant circuit heat exchanger configured to exchange heat between the refrigerant circulating in the refrigerant circuit and the first coolant;
        a Coolant Heater Control Module (CHCM) including a high voltage heating element;
        a mixing valve configured to occupy one of a first position, a second position, and a third position, wherein the mixing valve modulates flow of the first coolant between the Coolant Heater Control Module and the first coolant circuit heat exchanger;
        a bypass valve configured to occupy one of a bypass position and a linked position, wherein the bypass valve is configured to direct flow of the first coolant exclusively to the first coolant pump when occupying the bypass position and further configured to direct flow of the first coolant exclusively to the engine when occupying the linked position;
    a controller, having a processor and tangible, non-transitory memory on which is recorded instructions, wherein executing the recorded instructions causes the processor to actuate the mixing valve and the bypass valve to predetermined positions to effectuate a selected mode of operation for the thermal management system, wherein the selected mode of operation is one of a high efficiency mode, a heat pump assist mode, a maximum performance mode, or propulsion system energy improvement mode;
    wherein when the selected mode of operation is the high efficiency mode, the controller actuates the bypass valve to occupy the bypass position and direct flow of the first coolant exclusively to the first coolant pump, and wherein the controller actuates the mixing valve to occupy the first position and direct flow of the first coolant exclusively to the first coolant circuit heat exchanger;
    wherein when the selected mode of operation is the heat pump assist mode, the controller actuates the bypass valve to occupy the bypass position and direct flow of the first coolant exclusively to the first coolant pump, and wherein the controller actuates the mixing valve to occupy the second position and direct flow of the first coolant to each of the first coolant circuit heat exchanger and the Coolant Heater Control Module;
    wherein when the selected mode of operation is the maximum performance mode, the controller actuates the bypass valve to occupy one of the bypass position and the linked position, and wherein the controller actuates the mixing valve to occupy the third position and direct flow of the first coolant exclusively to the Coolant Heater Control Module;
    wherein when the selected mode of operation is the propulsion system energy improvement mode, the controller actuates the bypass valve to occupy the linked position and direct flow of the first coolant exclusively to the engine, and wherein the controller actuates the mixing valve to occupy the first position and direct flow of the first coolant exclusively to the first coolant circuit heat exchanger.

2. The thermal management system of claim 1 wherein the refrigerant circuit includes:
    a compressor;
    the first coolant circuit heat exchanger configured to exchange heat between the refrigerant and the first coolant flowing therethrough;
    an AC condenser configured to exchange heat between the refrigerant and an ambient environment;
    at least one mode selection valve configured to occupy one of a first position and a second position;
    wherein the refrigerant circuit operates in the first mode, when the at least one mode selection valve occupies the first position, wherein the refrigerant expelled from the compressor is directed exclusively to the first coolant circuit heat exchanger; and
    wherein the refrigerant circuit operates in the second mode, when the at least one mode selection valve occupies the second position, wherein the refrigerant expelled from the compressor is directed exclusively to the AC condenser;
    wherein the refrigerant circuit operates in the first mode when the thermal management system operates in each of the high efficiency mode, the heat-pump assist mode, and the maximum performance mode; and
    wherein the refrigerant circuit operates in each of the first mode and the second mode when the selected mode of operation is the propulsion system energy improvement mode.

3. The thermal management system of claim 2 wherein the selected mode of operation is the maximum performance mode, and wherein the controller actuates the bypass valve to occupy the bypass position to direct flow of the first coolant exclusively to the first coolant pump, when the temperature of the first coolant circulating through the engine, sensed by an engine coolant temperature sensor, is below a predetermined threshold temperature.

4. The thermal management system of claim 3 wherein the controller actuates the bypass valve to occupy the linked position to direct flow of the first coolant exclusively to the engine, when the first coolant circulating through the engine reaches the predetermined threshold temperature.

5. The thermal management system of claim 2 wherein when the selected mode of operation is the propulsion system energy improvement mode, the refrigerant circuit operates in the first mode until the engine reaches a predetermined threshold temperature, thereby utilizing the engine as a heat sink; and wherein the refrigerant circuit operates in the second mode when the engine exceeds the predetermined threshold temperature.

6. The thermal management system of claim 2 wherein the refrigerant circuit further includes a first expansion device and a second expansion device, wherein each of the first expansion device and second expansion device are each configured to receive the refrigerant from the first coolant circuit heat exchanger when the refrigerant circuit operates in the first mode; and wherein the first expansion device and the second expansion device are further configured to receive the refrigerant exclusively from the AC condenser when the refrigerant circuit operates in the second mode.

7. A method of controlling a thermal management system for a vehicle, the method comprising:
providing the thermal management system including a first coolant circuit configured to circulate a first coolant and a refrigerant circuit configured to circulate a refrigerant, wherein the first coolant circuit includes a first coolant pump, a first coolant circuit heat exchanger, and a Coolant Heater Control Module (CHCM);
selecting, via a controller, a mode of operation for the thermal management system, wherein the mode of operation is one of a high efficiency mode, a heat pump assist mode, a maximum performance mode, and propulsion system energy improvement mode;
signaling, via the controller, the thermal management system to operate in the selected mode of operation;
actuating, via the controller, a bypass valve to occupy one of a bypass position and a linked position, wherein:
when the selected mode of operation is the high efficiency mode, the controller actuates the bypass valve to occupy the bypass position and direct flow of the first coolant exclusively to the first coolant pump;
when the selected mode of operation is the heat pump assist mode, the controller actuates the bypass valve to occupy the bypass position and direct flow of the first coolant exclusively to the first coolant pump;
when the selected mode of operation is the maximum performance mode:
the controller actuates the bypass valve to occupy the bypass position and direct flow of the first coolant exclusively to the first coolant pump until the first coolant circulating through the engine reaches a predetermined threshold temperature; and
the controller actuates the bypass valve to occupy the linked position directing flow of the first coolant exclusively to the engine when the first coolant circulating through the engine reaches the predetermined threshold temperature;
actuating, via the controller, a mixing valve to occupy one of a first position, a second position, and a third position, wherein:
when the selected mode of operation is the high efficiency mode, the controller actuates the mixing valve to occupy the first position and direct flow of the first coolant exclusively to the first coolant circuit heat exchanger;
when the selected mode of operation is the heat pump assist mode, the controller actuates the mixing valve to occupy the second position and direct flow of the first coolant to each of the first coolant circuit heat exchanger and the Coolant Heater Control Module;
when the selected mode of operation is the maximum performance mode, the controller actuates the mixing valve to occupy the third position and direct flow of the first coolant exclusively to the Coolant Heater Control Module;
when the selected mode of operation is the propulsion energy system improvement mode, the controller actuates the mixing valve to occupy the first position and direct flow of the first coolant exclusively to the first coolant heat exchanger; and
signaling, via the controller, the refrigerant circuit to operate in one of a first mode and a second mode based upon the selected mode of operation.

8. The method of claim 7 wherein selecting a mode of operation for the thermal management system includes selecting the high efficiency mode, and wherein signaling the refrigerant circuit to operate in one of a first mode and a second mode based upon the selected mode of operation further includes signaling the refrigerant circuit to operate in the first mode.

9. The method of claim 7 wherein selecting a mode of operation for the thermal management system includes selecting the heat pump assist mode, and wherein signaling the refrigerant circuit to operate in one of a first mode and a second mode based upon the selected mode of operation further includes signaling the refrigerant circuit to operate in the first mode.

10. The method of claim 7 wherein selecting a mode of operation for the thermal management system includes selecting the maximum performance mode, and wherein signaling the refrigerant circuit to operate in one of a first mode and a second mode based upon the selected mode of operation further includes signaling the refrigerant circuit to operate in the first mode.

11. The method of claim 7 wherein selecting a mode of operation for the thermal management system includes selecting the propulsion system energy improvement mode; and wherein signaling the refrigerant circuit to operate in one of a first mode and a second mode based upon the selected mode of operation further includes:
signaling, via the controller, the refrigerant circuit to operate in the first mode, until the engine reaches a predetermined threshold temperature, to thereby utilize the engine as a heat sink;
evaluating, via an engine coolant temperature sensor, the temperature of the engine;
comparing, via the controller, the temperature of the engine and the predetermined threshold temperature; and
signaling, via the controller, the refrigerant circuit to operate in the second mode if the temperature of the engine exceeds the predetermined threshold temperature.

12. The method of claim 11 wherein the refrigerant circuit includes:
a compressor;
the first coolant circuit heat exchanger configured to exchange heat between the refrigerant and the first coolant flowing therethrough;
an AC condenser configured to exchange heat between the refrigerant and an ambient environment; and at least one mode selection valve configured to occupy one of a first position when the refrigerant circuit operates in the first mode, such that the refrigerant expelled from the compressor is directed exclusively to the first coolant circuit heat exchanger and a second position when the refrigerant circuit operates in the second mode, such that the refrigerant expelled from the compressor is directed exclusively to the AC condenser.

13. The method of claim 12 wherein the step of signaling the refrigerant circuit to operate in the first mode, until the engine reaches a predetermined threshold temperature, to thereby utilize the engine as a heat sink further includes:
   signaling, via the controller, at least one electric cooling fan associated with the AC condenser to be powered off; and
   actuating, via the controller, a plurality of vehicle aero shutters to a closed position.

\* \* \* \* \*